United States Patent Office 3,426,337
Patented Feb. 4, 1969

3,426,337
POSITIONING SYSTEM FOR RANDOM ACCESS DEVICE
Robert J. Black, Los Gatos, George J. Thaler, Carmel, Peter I. Prentky, Los Gatos, and Richard D. Cordano, San Jose, Calif., assignors to International Business Machines Corporation, Armonk, N.Y., a corporation of New York
Filed Dec. 21, 1964, Ser. No. 420,009
U.S. Cl. 340—174.1    16 Claims
Int. Cl. G11b 5/02

ABSTRACT OF THE DISCLOSURE

A positioning system in which the radial and spiral edges of a pattern on a movable record member are sensed to provide time base pulses and radial position pulses. A signal at a multiple frequency of the time base pulses and in phase-locked relation therewith is applied to advance a counter until the count therein equals a count representing a desired position of a transducer carrying mechanical element relative to the record member. Pulses generated upon coincidence of the counts are phase compared with the radial position pulses to position the mechanical element in accordance with the difference therebetween.

This invention relates to systems for controlling the position of a movable member and more particularly to a system for rapidly and precisely moving a transducer to a position specified by a digital command.

In order to improve the relationship between access time and equipment size in random access memory units, it is desirable to increase the data density to the maximum consistent with reliability. Prior art systems have typically utilized open loop control, moving the transducer to a selected coarse position relative to the storage member of the random access memory. Thereafter, a detent or other fine positioning mechanism is employed to insure that the precise location of the track is maintained. In some systems, a reference pattern of optical or magnetic character is provided for the fine positioning function.

Even though systems of this nature may use reference patterns and transducers, they are still usually open loop in character as regards the data transducer and the storage member. Open loop mechanisms of this type inherently limit the degree of positioning control which can be achieved. Thus it is now being found that the track density attainable with such systems is approaching its upper limit. It is, therefore, highly desirable to be able to employ a closed loop system by which control of position is directly referred to the record member itself. Data density is directly affected by the degree of control that can be achieved in positioning a data transducer at a desired address. However, access time is also directly affected by the positioning system operation, so that the servo control for the positioning system must satisfy somewhat inconsistent speed and accuracy requirements. Fine control is achieved by using a narrow bandwidth servo system having relatively slow response speeds, whereas fast shifting from one position to another requires a wide bandwidth servo having less inherent stability. Most positioning systems, therefore, employ both coarse and fine positioning controls, with the coarse positioning control being used for rapid location of a track, and the fine positioning control thereafter being used for stable and precise following of the track.

The desired transducer address can readily be provided as a digital command supplied from a data processing system, but the generation of a digital signal which represents actual transducer location is considerably more difficult. It is feasible, for example, to use a transducer or variable signal generator, such as a precision potentiometer, together with an analog to digital converter. Systems of this kind are substantially inaccurate unless precisely made and complex and therefore impose sharp limitations on data density or are unduly expensive. It is also feasible to use optical and magnetic reference patterns on a disk, sensors on the transducer, and counter systems operating from the sensors to digitally represent radial track position. These arrangements, however, are often subject to error because of the lack of a positive reference and the possibility of noise or other transient effects introducing erroneous counts.

Furthermore, in all such systems it is highly desirable to simplify the control circuitry by which desired addresses and actual addresses are compared to generate an appropriate control signal. With binary digital addresses, for example, a common expedient is to subtract one from the other, and convert the amplitude and sense of the difference to an analog control quantity by a digital to analog converter. Such systems are not only inherently expensive, but are also inaccurate, because of the necessity for conversion and the difficulty of establishing precise analog values across a range of values.

It is therefore an object of the invention to provide a simple but accurate system for controlling the position of a movable member.

Another object of the invention is to provide an improved positioning mechanism for a random access memory.

Yet another object of the invention is to provide an improved system for controlling the position of a movable member in response to digital signals representing a desired address for the member.

Yet another object of the invention is to provide an improved reference pattern for random access memory systems.

A further object of the invention is to provide an improved random access memory having a simple but reliable closed loop positioning control.

These and other objects are achieved by a closed loop system in accordance with the invention that generates two time varying pulse series in response to the movement of a cyclic recording medium such as a magnetic disk. If a transducer is to be positioned radially relative to the disk, for example, the time displacement between paired pulses from the two series is varied in accordance with the radial position of the transducer. The time displacement relationship is determined by a unique radially varying reference pattern on the record member, defined by radial areas of differing sensible properties. The two pulse series are utilized to control a comparison arrangement which generates an amplitude varying signal to control the position of the transducer in response to the difference between a desired position and the actual transducer position.

In a specific example of a system in accordance with the invention, a cyclic record member such as a disk is provided with a referencepattern having generally radially directed spokes symmetrically disposed about the disk. One edge of each spoke is a radial transition or boundary, whereas the other is spirally disposed relative to the disk, such that the circumferential distance between the edges varies depending upon the radius (i.e. the transducer position) at which the operative mechanism is located. Means on the transducer generate signal variations to denote the radial boundaries and the spiral boundaries, these signal variations being synchronous with the rotation of the disk and comprising two interspersed pulse series. The first series, comprising those pulses derived from the radial boundary transitions, establishes time and speed references for the system whereas the second series, comprising those pulses derived from the spiral boundary transitions, varies with the radial position of the transducer. The radial position is thus defined in terms of the time displacement between an individual spiral boundary pulse and the immediately preceding or succeeding radial boundary pulse. For this arrangement, the desired address for the transducer may typically be in the form of a binary count. The radial boundary transition pulses are utilized to control the frequency of a high frequency oscillator that generates a fixed number of pulses as each circumferential segment of the disc passes a given reference point. The fixed number of pulses is conveniently chosen as a multiple of two, in order that a recycling binary counter may uniformly and simply subdivide the circumferential segments into time increments. For each time increment there is one corresponding transducer position relative to the spiral boundary on the reference pattern, and the radial data tracks on the disk. The time displaced pulses generated from the reference pattern on the disk, and the binary address desired for the transducer, are used to control a comparator system for the correction of transducer position. The count maintained in the recycling counter is continuously compared in a first comparator to the desired address, and a coincidence indication is provided at some time within a given circumferential segment. Dependent upon actual transducer position, the spiral boundary transition pulse is provided at some other time within the same circumferential segment, so that the time interval between these two pulses determines the amplitude and the sense of the correction that is needed to bring the transducer to the desired position. These two pulses are therefore used to initiate and terminate operation of a circuit that generates a ramp signal and holds the level ultimately established. The amplitude of this signal is proportional to the time displacement between the paired pulses of two series, and is reduced to zero as the transducer is brought to the desired position.

The foregoing and other objects, features and advantages of the invention will be apparent from the following more particular description of a preferred embodiment of the invention, as illustrated in the accompanying drawings.

Figure 1:
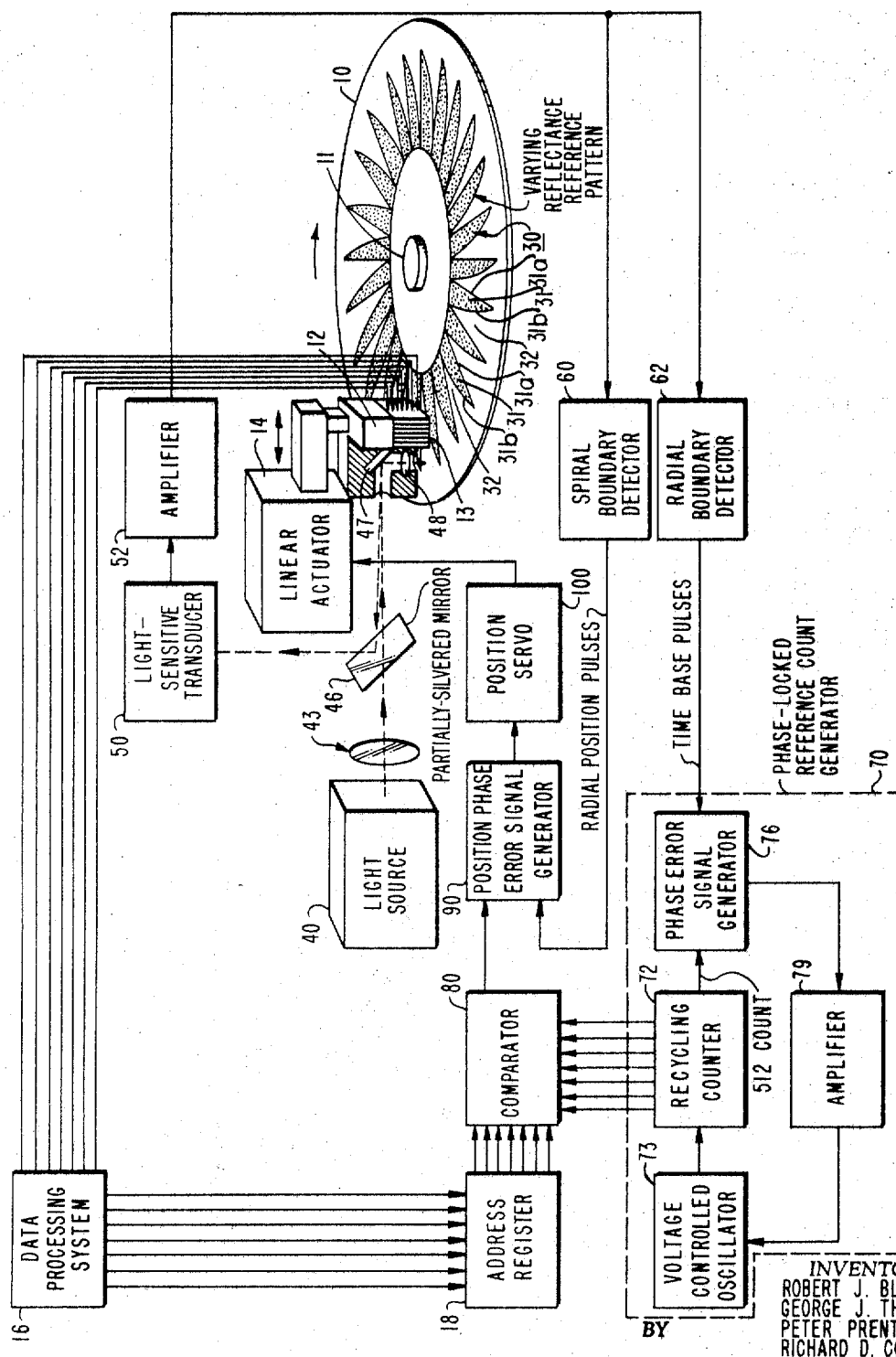
FIG. 1 is a combined block and simplified perspective representation, partially broken away, of one arrangement of a positioning system in accordance with the invention.

As shown in FIG. 1, to which reference is now made, a closed loop positioning control system in accordance with this invention is intended for use with a magnetic storage disc 10 mounted on a shaft 11 for clockwise rotation, as seen in FIG. 1. The drive means for the disk 10 may be conventional and is not shown for simplicity. A multi-head read-write data transducer assembly 12 including magnetic heads 13 is disposed in magnetic relation to the data storage portion of the disk 10, and mounted for radial movement under the control of a controllable linear actuator 14 to which it is mechanically coupled. Electrical signals representing digital data are transferred between the heads 13 and a data processing system 16 after the transducer 12 has been moved to a selected position. The data processing system 16 also provides address and timing control circuits for the associated circuits and elements described below, to control the data transfer operations in well-known fashion. In accordance with common practice, therefore, digital data is recorded on, or reproduced from a pattern of a plurality of concentric data tracks on the disk 10, each of which tracks is located at a discreet radial distance from some reference point on the disk 10.

An address register 18 responsive to the address data from the data processing system 16 provides digitally encoded electrical signals representing desired track addresses for the data transducer assembly 12. To generate signals representing the instantaneous actual radial position of the data transducer 12, the storage disk is provided with a position reference pattern 30 which is here substantially coextensive with the data storage portion of the disk 10. Greater utilization of the employable disk 10 surface is achieved in this manner, although the principles of the invention are also directly applicable to systems in which the reference pattern and data storage areas are separate. It has been found feasible, however, to employ thin films providing substantial optical contrast (e.g. reflectance variations of from 4:1 to 9:1) without interfering with magnetic interaction.

The optical reference pattern may be defined by any thin optical layer which does not present substantial magnetic shielding, so as to impede data transfer. For this purpose, a thin layer of photoresist may be coated on the entire magnetic surface, and selectively removed in the desired pattern in order to provide the alternate areas 31, 32 of varying reflectivity. The spokes may of course be of either high or low reflectivity as desired.

The position reference pattern 30 comprises circumferentially alternating areas 31, 32 of differing reflectivity. Areas 31 of low reflectivity are disposed symmetrically about the disk 10, and define radial spokes having one radial boundary and one spiral boundary. A radial boundary or edge 31a has a length equal to a desired radial across the disk 10, whereas a spiral edge 31b intersects the radial edge 31a of the adjacent spoke at the innermost radius, and the radial edge of the same spoke at the outmost radius. In this manner, the data storage area of disk 10 is divided into equal circumferential segments or sampling sectors by the radial boundaries 31a of the low reflectivity areas 31.

By the definition of a spiral, the spiral edge 31b changes circumferentially in accordance with the radial position. The actual spiral used is the spiral of Archimedes, defined as "a curve traced by a point moving uniformly along a line which at the same time revolves uniformly round a fixed point in itself." Circumferential velocity varies directly as the radius with a disk member, and the spiral pattern compensates for the velocity variations. Thus the path of the spiral edge varies as the square of the distance, but the time required to traverse the distance between a spiral edge and a radial edge of a given spoke varies linearly with radial position within the inner and outer radial limits of the pattern. Significant use is made of this feature in the control circuitry.

The reference pattern 30 is sensed by an optical sensing system which introduces extremely low mass and inertia into the transducer positioning mechanism. A light source 40 separately positioned from the transducer assembly 12 is concentrated by a beam collimating and shaping lens system 43, indicated only schematically. A narrow beam of light is thereby formed and directed through a partially silvered mirror 46 along a radial path toward the transducer assembly 12. The partially silvered mirror 46 is disposed at a 45° angle to the light path, as is a front mirror 47 mounted within the transducer assembly 12. The front mirror 47 is positioned to direct the collimated light beam through a focusing lens 48 against a point on the disk 10 having a fixed position relative to the radial position of the magnetic heads 13 in the transducer 12. The intensity of the light beam reflected from the disk 10 is modulated in accordance with the reflectivity of the minute area against which the light beam is then directed. The reflected beam, modulated in this fashion, is again collimated by the lens 48, reflected off the front mirror 47, and back along the radial light path to be reflected off the partial silvered mirror 46 and onto a light-sensitive transducer 50, such as a photomultiplier, cadmium sulfide cell or photodiode. The sensed signal is suitably amplified in an amplified circuit 52 and coupled to the remainder of the control circuits in accordance with the invention.

As the disk 10 rotates, therefore, the front mirror 47 is moved with the transducer assembly 12 to a radial position having a fixed relation to the data tracks, and the light sensitive transducer 50 generates a signal (here a square wave) having a transition corresponding to each reflectivity transition in the reference pattern 30. Those skilled in the art will recognize that each separate location or address for the transducer assembly 12 requires a number of parallel data tracks when a multihead assembly is used. A number of recognized expedients may be used for achieving adequate head separation and close track-to-track spacing and these need not be discussed here. When reference is made to a desired address or location, it will be unuderstood to refer to a position for the transducer assembly 12 as a whole.

The transitions in the reference pattern signal are utilized to generate approprate separate pulses in a spiral boundary detector 60 and a radial boundary detector 62. With the disk 10 rotating clockwise as shown in FIG. 1, for example, the spiral edge 31b is denoted by a transition from a high reflectivity area to a low reflectivity area, which for purposes of illustration may be assumed to provide a negative-going transition. Thus the spiral boundary detector 60 may include a differentiating circuit, and means, such as a one-shot multivibrator, for generating a pulse of selected amplitude and duration in response to each negative-going transition. The radial boundary detector 62 may similarly generate a selected pulse in response to each positive-going transition, denoting each radial edge. Inasmuch as these circuits may be provided by these conventional means, they have not been shown in detail in order to simplify the description.

The pulses from the radial boundary detector 62 may be referred to as time base pulses, whereas those from the spiral boundary detector 60 form a time analog of the radial position, and therefore may be referred to as radial position pulses. The radial boundary detector 62 provides the time base pulses to a phase-locked reference count generator 70 which includes a recycling counter 72 and a voltage controlled oscillator 73. It is convenient to operate the voltage controlled oscillator 73 at a nominal frequency which is a multiple, relative to the frequency of the time base pulses, equal to the number of separate data track positions available for the transducer assembly 12. Thus, if the transducer is to be positioned to any of 512 data track positions, the voltage controlled oscillator 73 is intended to be operated at a frequency 512 times that of the time base pulses. The voltage controlled oscillator 73 is synchronized to the disk 10 speed by arranging the recycling counter 72 to reset to zero after the 512th count, and comparing the time of occurrence of this reset phase to the time of occurrence of the closest time base pulse. Tthe recycling counter 72 may, in the present example, comprise a straightforward binary chain inasmuch as 512 is the 9th power of 2. The overflow pulses from the recycling counter 72 and the time base pulses are applied to separate inputs of a phase error signal generator 76, which may comprise any conventional arrangement for generating an amplitude varying control output which is proportional to the time displacement between the pulses on the input terminals. This control output signal is supplied through a feedback amplifier 79 having suitable gain to the control input of the voltage controlled oscillator 73.

As the voltage controlled oscillator 73 is maintained in synchronism with the disk 10 speed, therefore, the recycling counter starts at zero count for each radial transition in the reference pattern 30, and proceeds in substantially equal time increments to the 512th count, attaining this count in synchronism with the next time base pulse, or radial boundary transition. Thus, as the disk 10 rotates each radial segment is divided into 512 equal time segments, these time segments also denoting the times at which successively varying radial positions of a spiral boundary pass a given point, such as the reference point illuminated by the focused light beam.

As the recycling counter 72 advances at a rate determined by the oscillator 73, it provides a digital representation of successive equal increments within each circumferential subdivision or sampling sector on the disk 10. This recycling digital count is coupled to one set of inputs of a comparator circuit 80 which is also coupled to the address register 18. Upon coincidence of these counts within each sampling sector, the comparator provides a pulse having a particular time relation to the disk 10 subcycle defined by the adjacent radial edges 31a. The pulses from the comparator 80 represent desired or reference position pulses within each subcycle, whereas the radial position pulses identify actual transducer position. Thus two pulse series having like pulse repetition frequencies but a varying phase relation between individual pairs of pulses are provided, and applied to a position phase error signal generator circuit 90 which may be similar to the phase error signal generator 76 previously described.

An amplitude varying signal which is proportional in amplitude to the time relation between the reference and the radial position pulses is generated by the position phase error generator 90. This signal is applied to control the position actuator 14, with appropriate lead-lag and damping characteristics being introduced through a position servo 100 that may be of the velocity feedback type.

Figure 3:
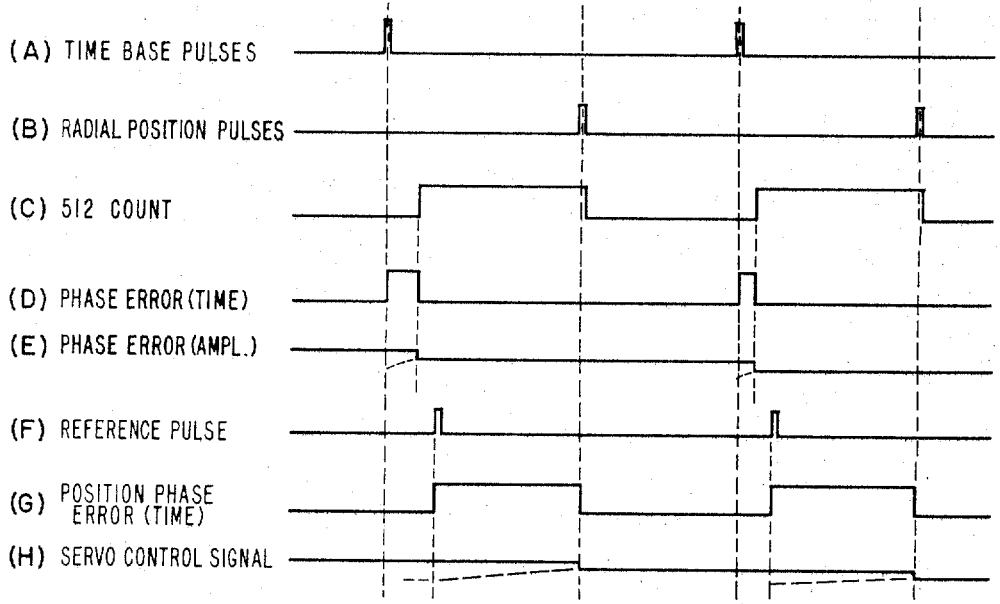
FIG. 3 is a graphical representation of a number of waveforms useful in explaining the operation of the arrangement of FIGS. 1 and 2.

The system of FIG. 1 provides a unique position control system which operates in response to digital commands. As the disk 10 rotates, the time-varying signal reproduced by the light sensitive transducer 50 is separated by the spiral boundary detector 60 and the radial boundary detector 62 into two pulse series, one being the time base pulses shown in waveform A of FIG. 3, and the other being the radial position pulses shown in waveform B of FIG. 3. As the time base pulses are applied to the reference count generator 70, the voltage controlled oscillator 73 is operated in synchronism at the predetermined harmonic frequency. Each cycle of the harmonic frequency signal advances the recycling counter 72 to provide successively increasing binary count representations, until the final count is reached. The last or overflow stage representing the 29th digit, here designated as the 512 count, alternates, providing (in the specific example of waveform C in FIG. 3) a positive-going deviation to designate the zero state for each subcycle. The phase error signal generator 76 generates an amplitude varying signal to control the voltage controlled oscillator 73. This amplitude varying signal (waveform E in FIG. 3), may be generated first as a pulse duration modulated signal (waveform D), with the pulse being initiated by the time base signal (waveform A) and terminated by the positive-going deviation in the 512th count (waveform C). The phase error signal is used to operate a ramp generator and hold circuit which provides the output signal shown as waveform E.

Once each subcycle, the count from the address register 18 is identical with that from the recycling counter 72, and at this time the reference pulse (waveform F) is generated and applied to the position phase error signal generator 90. It is convenient but not necessary to utilize the time base pulses for reset purposes in the phase error signal generator 90, as described below in conjunction with FIG. 2. The time displacements between the reference pulses and the radial position pulses, define, in amplitude and polarity, the leading and trailing edges of a pulse duration modulated (waveform G) which may control a ramp generator and hold circuit that generates the servo control signal (waveform H). With appropriate anticipation and damping control introduced by the position servo 100, the position actuator 14 moves the transducer 12 to a selected position at which data transfer may begin.

In this arrangement, therefore, the position signal for controlling the transducer is referred to the disk 10 itself. No external position transducer is required, and the mechanism for providing optical sensing introduces minimum mass and inertia to the transducer assembly. Position and reference values are defined on the time base in a fashion which permits greatest accuracy without introducing system complexity. It will be noted that this system operates in binary fashion throughout, although the equivalent of an analog to digital conversion is effected. To generate an analog control signal, the time base pulses control an incrementally varying digital count which is synchronized with the cyclic storage medium. The desired address or position for the movable member is then converted to a time varying signal, having a predetermined phase relation to the subcycle. The actual address, derived from the reference pattern is identified similarly on the time base. Thus the problem of conversion is reduced to an essentially simple one of converting time relationships to analog quantities. Because control is effected by reducing the time displacement to zero the closed loop system seeks the null condition and is therefore free of drift and linearity problems. Because signal switching may take place extremely rapidly (of the order of fractions of a microsecond, relative to the longer intervals required to move the mechanism), a high degree of precision is obtained through use of the time base for servo error signal generation. The servo may also be made nonlinear to enhance lock-on and tracking capabilities. Inasmuch as the electrical circuits are extremely fast acting, the ability of the system to achieve high track density is limited primarily by the accuracy with which the reference pattern 30 may be laid down and sensed. For a typical multihead system, however, in which a specified distance between adjacent tracks must usually be maintained, the tracking accuracy is far more than is required.

Systems in accordance with the invention may be utilized with other cyclic mediums, and with other forms of reference patterns. For example, the use of a pair of variably phase related pulse series is also feasible for a magnetic drum system, in which it is desired to position a head assembly at some point along the length of the drum. Because all points on the drum periphery have a like velocity, however, linearly varying instead of spirally varying boundaries would be employed. The reference pattern need not be optical, but may comprise any suitably contrasting variations, including magnetic as well as radiation sensible variations.

Another aspect of the invention is the provision of an improved reference pattern for a cyclic member, particularly a disk for random access memories. Radial positions relative to the disk may be readily defined by this arrangement in a fashion which provides both coarse and fine definition of position. The recycling counter type of system, however, provides a particularly suitable means for operating a controllable mechanism in response to digital commands, when used in conjunction with this type of reference pattern.

Figure 2:
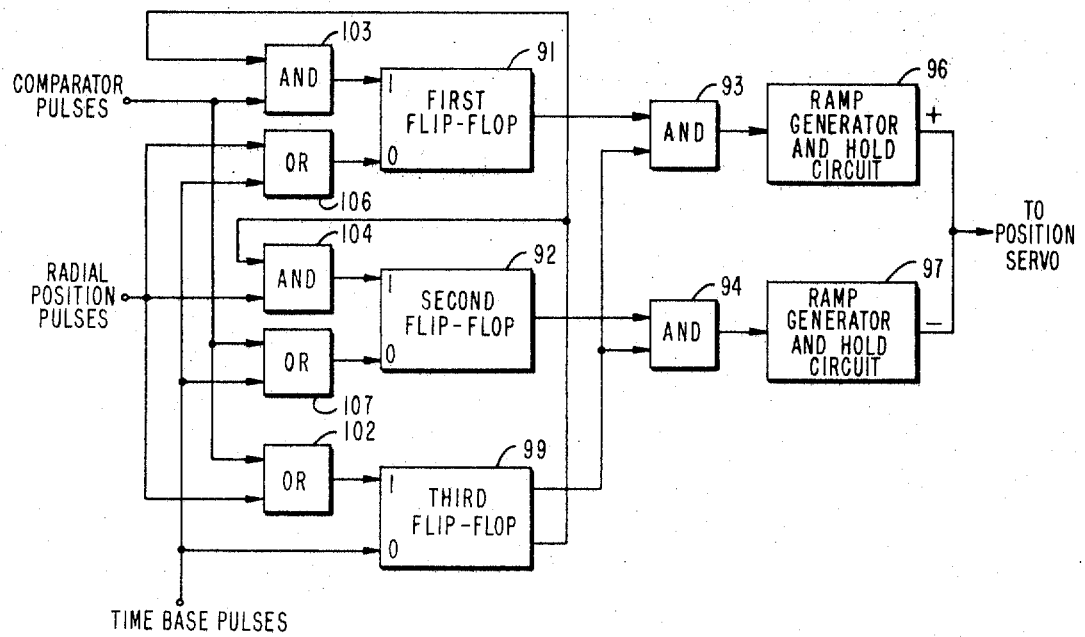
FIG. 2 is a block diagram representing a phase error signal generator for use in the arrangement of FIG. 1.

An example of a position phase error signal generator circuit, suitable for the circuit 90 in FIG. 1, is provided in FIG. 2. The circuit of FIG. 2 provides an output signal of amplitude and polarity which is representative of the time displacement relationship of the radial position pulses to the comparator pulses as well as the lead-lag relationship of individual pairs of pulses. This is merely one arrangement for converting time displacement relationships to analog signal values, and a variety of alternatives will present themselves to those skilled in the art.

In FIG. 2 first and second flip-flops 91, 92 activate one input of coupled AND gates 93, 94 when set to their respective one-valued states. Each AND gate 93, 94 controls a different ramp generator and hold circuit 96, 97 to provide positive and negative output signals respectively, or both may provide positive and negative signals if desired. The ramp generator and hold circuits 96, 97 rise from a reference level to a finel level at a given slope during an active state determined by the active interval of the associated AND gates 93, 94. Thus the duration of the applied signal is converted to a proportional amplitude. The ramp generator and hold circuits 96, 97 thereafter maintain the established output level until a new charging level is obtained following the generation of a new ramp waveform.

The lead-lag relationship between the comparator pulses and radial position pulses is determined by a third flip-flop 99, which is set to the one-valued state by either comparator pulses or radial position pulses applied through an OR circuit 102. When thus set the flip-flop 99 activates the appropriate AND gate 93, 94. Until it is set into the one-valued state, the third flip-flop 99 conditions a pair of AND gates 103, 104 that control the one-valued input terminals of the first flip-flop 91 and second flip-flop 92, respectively. Comparator pulses are applied to the AND gate 103, whereas radial position pulses are applied to the AND gate 104, so that concurrently with setting the third flip-flop 99 both AND gates 103, 104 are deactivated as either the first or second flip-flop 91, 92 is set. Thereafter, the appropriate ramp generator and hold circuit 96 or 97 is energized as described above to establish the desired positive or negative output signal. The system therefore unambiguously identifies the lead-lag relationship within each subcycle. OR gates 106, 107 are employed at the zero input terminals of the first and second flip-flops 91, 92, with the time base pulses being applied to reset all three of the flip-flops 91, 92, 99 at the termination of each subcycle.

The described arrangement may include signal averaging circuits at the output end of the hold circuits, to avoid transients during the signal charging and discharging intervals, if desired. Alternatively, it may be preferred to use, for each polarity output signal, a pair of ramp generator circuits coupled together to a common output terminal through an OR circuit. These circuits may then be alternatively activated and sequelched (discharged to the starting level), so that the output signal is substantially continuous without the use of averaging circuits and also is transient-free.

While the invention has been particularly shown and described with reference to a preferred embodiment thereof, it will be understood by those skilled in the art that various changes in form and details may be made therein without departing from the spirit and scope of the invention

What is claimed is:

1. A closed loop servo system for positioning a movable mechanical element at a given position relative to a member including, first means coupled to the element for providing a signal train representing the actual position of the element relative to the member, the signal train including a cyclic signal component and a second signal component which is variably time-spaced relative to the cyclic component dependent upon the position of the element, second means responsive to the cyclic component of the signal train for generating a signal at a multiple frequency thereof, third means responsive to the multiple frequency signal for generating a third signal component which is spaced in time relative to the second signal component to define a desired position for the element and means responsive to the time relation of the second and third signal components for controlling the position of the movable element.

2. A servo system for positioning a movable mechanical element at a given position relative to a member including, first means coupled to the element for providing a signal train representing the actual position of the element relative to the member, the signal train including a cyclic component and a component which is variably time-spaced relative to the cyclic component, second means providing a digitally coded position signal representing a desired position of the element relative to the member, third means coupled to the first means and responsive to the cyclic component of the signal train for generating controlled frequency count variations defining a preselected fixed number of time increments within the cyclic component, fourth means coupled to the first, second, and third means and responsive to the variably time-spaced components, the digitally coded position signal, and the controlled frequency counts for generating a position error signal representing any displacement existing between the actual and desired positions of the element, and means coupled to the fourth means and responsive to the position error signal for controlling the position of the mechanical element relative to the member.

3. A servo system for positioning a movable mechanical element at a given position relative to a record member system including, first means coupled to the element for providing a signal, the variations of which represent the speed of the member and the actual position of the element relative to the member, the signal including a cyclic component synchronous with the member and a second component having a variable time relation relative to the cyclic component, dependent upon the position of the element relative to the member, second means providing a position signal representing a desired position of the element relative to the member, the position signal being provided as a binary code having multiple digits in parallel, third means coupled to the first means and responsive to the cyclic component of the signal, said third means including a variable frequency oscillator having a nominal frequency which is an integral multiple of the frequency of the cyclic component, and a resettable counter which is advanced by the variable frequency oscillator, the resettable counter resetting at a number of counts which constitute the same multiple of the frequency of the cyclic component, and said third means further including means responsive to the phase relation of the resetting of the counter means and the cyclic component for controlling the frequency of the variable frequency oscillator, such that successive counts define a preselected fixed number of the time increments within the interval defined by successive cyclic components, said resettable counter means providing a binary coded pattern having multiple digits in parallel, comparator means coupled to receive the position signal and the signal from the resettable counter means, for providing a time displaced position signal representing a desired position of the element relative to the member, and means responsive to the second component of the signal and the time displaced position signal for controlling the position of the movable element in response to the relationship thereof.

4. A closed loop positioning control for locating a transducer at a desired address along a given axis relative to a cyclically movable member, comprising reference means providing separate sampling sectors on the cyclically movable member, the sampling sectors including sensible transitions varying in the direction normal to the given axis for different positions along the given axis, means coupled to the transducer for sensing the reference means variations to identify actual transducer position along the given axis, means responsive to the sensing means and the desired address for providing a first pulse for each sampling sector indicative of the desired transducer position, means responsive to the sensing means for providing a second pulse for each sampling sector indicative of the actual transducer position, and means responsive to the time relation of the first and second pulses for controlling the position of the transducer.

5. A closed loop positioning control for locating a first member at a desired position along a given axis relative to a cyclically movable second number, comprising reference means on the second member for defining successive equal sectors having like sensible patterns including at least one characteristic deviation in the direction normal to the given axis, means responsive to the sensible patterns for providing time base pulses identifying the passage of successive sectors during movement of the second member, means coupled to the first member and responsive to the characteristic deviation in the sensible patterns for providing actual position pulses representative of the position of the first member along the given axis, means responsive to the time base pulses for generating time varying signals dividing the interval between time base pulses into a fixed number of time increments, means responsive to the time varying signals for providing desired position pulses representative of the desired position of the first member along the given axis and means responsive to the time relation of the actual and desired position pulses for moving the first member to a position at which the pulses are in coincidence.

6. A closed loop positioning control for precisely locating a first member at a desired position along a given axis relative to a cyclically movable second member, comprising reference means on the second member for defining successive equal sectors having like sensible patterns, and including a first characteristic deviation within each sector lying parallel to the given axis during passage of the second member past a given reference position, and a second characteristic deviation which varies in position within the sector in correspondence to a position along the given axis, the second characteristic deviation varying both with time and velocity at the point along the given axis at which the pattern is sensed, means coupled to and movable with the first member for sensing the characteristic deviations of the sensible patterns, means responsive to the first and second characteristic deviations in the patterns for providing time base pulses and actual position pulses, the time base pulses identifying the passage of successive sectors during movement of the second member, thus to define subcycles within the complete cycles of movement of the second member, the actual position pulses having variable time displacements within the subcycles dependent upon the location of the first member along the given axis, resettable counter means, the resettable counter means being arranged to be reset at a given fixed count and to provide an output pulse indicative thereof, variable frequency oscillator means having a nominal frequency which is a multiple corresponding to the given fixed count of the frequency of the subcycles, the variable frequency oscillator means being coupled to advance the resettable counter means with each cycle of the variable frequency signal, phase comparator means coupled to receive the time base pulses and the reset output signal from the resettable counter means, and controlling the variable frequency oscillator means in response thereto, comparator means responsive to a desired position indication for the first member and to the output signals from the resettable counter means for providing a desired position pulse within each subcycle as the resettable counter means is advanced, and second phase comparator means responsive to the time relation of the actual and desired position pulses from moving the first member to a position at which the pulses are in coincidence.

7. A system for positioning a movable member relative to a second, cyclically movable member, including the combination of means providing a digital representation of a desired address for the first member relative to the cyclically movable member, means disposed on the cyclically movable member for providing reference patterns thereon, the reference pattern being disposed in regularly separated sectors along the path of movement of the cyclically movable member, and having two characteristic variations within each sector, means coupled to the first member and responsive to the patterns on the cyclically movable member for generating a signal representative thereof, means responsive to the generated signal for generating two pulse trains, each representative of a different characteristic of the pattern on the cyclically movable member, means responsive to one of the pulse trains for generating successive digital counts representative of equal increments within a sector of the cyclically movable member, comparator means responsive to the desired address and to the successively variable counts for indicating coincidence thereof, and means responsive to the second of the pulse trains and the detection of coincidence for controlling the movable member to move the first member to a desired position relative to the cyclically movable member.

8. A system for radially positioning a transducer relative to a random access memory disk, the memory disk having a symmetrically disposed reference pattern comprising a plurality of radially disposed spokes thereon, the spokes each comprising a radial boundary transition and a spiral boundary transition, the system including means coupled to the transducer and responsive to the reference pattern adjacent thereto for generating signals representative thereof, means responsive to the generated signals for generating radial boundary pulses and spiral boundary pulses, variable frequency oscillator means, means including recycling counter means coupled to be advanced by the variable frequency oscillator means, means responsive to the recycling of the recycling counter means and to the radial boundary pulses for controlling the frequency of the variable frequency oscillator means to maintain a frequency thereof which is a selected multiple of the frequency of the radial boundary pulses, means providing a desired transducer position address as a binary count, binary comparator means coupled to receive the binary count and the recycling counter count, for providing an output signal on the coincidence thereof, phase error signal generator means coupled to receive the output signal from the binary comparator means and the spiral boundary pulses, for providing an amplitude varying signal representative of the desired correction needed for the transducer, and positioning means responsive to the error signal and coupled to control the transducer.

9. A system responsive to variably timed signals occurring between regularly repetitive cyclic signals, the timed signal constituting a time analog of a physical dimension, the system comprising: means responsive to the cyclic signals for producing a series of first electrical signals dividing each of the cyclic time intervals between successive cyclic signals into a predetermined number of equal time increments, means for providing second electrical signals representing a desired magnitude of the physical dimension, means coupled to receive the first and second electrical signals for producing a repetitive third electrical signal at the frequency of the cyclic signals and having a time relation to the cyclic signals representative of a desired physical dimension, and means responsive to the variably timed signals and the third electrical signals for bringing said signals into time coincidence.

10. In a servomechanism for establishing and maintaining a preselected incremental radial position of a controllable element with reference to a rotatable member in response to an error signal derived from the time difference between an incremental preselected position signal and a signal representing the actual position of the element, apparatus for generating the error signal comprising: a circumferentially disposed, sensible pattern provided on at least a portion of at least one surface of the member, and characterized by a plurality of radial lines spaced at equal angles to denote the beginning of each of a series of time intervals, and a like plurality of spiral lines originating at the inner end of each radial line and curving away from the radial lines in a common direction, so that the length of a circular arc between the radial lines and the spiral lines is a function of the square of radial distance; sensing means including means movable with the controllable element and disposed opposite the surface and responsive to the sensible patterns for providing pairs of electrical signals, each made up of first and second signals spaced apart in time by an interval determined by the distance between successive radial and spiral lines; means responsive to the first signals for generating during each of the series of time intervals a fixed plurality of electrical pulses having a periodicity determined by an electrical control signal; means coupled to receive the first signals and responsive to the terminal pulse in the plurality of pulses to provide an electrical control signal representative of the time relation of the terminal pulse and the first electrical signal, the electrical control signal being coupled to control the generating means; means coupled to the generating means for developing a third electrical signal having a time displacement, relative to the first signal, representing a desired radial position of the element; means coupled to receive the second signals and the third signals, and responsive to the time displacement between the second and the third electrical signals to produce an error signal representing the deviation of the element from the desired radial position; and means responsive to the error signal for controlling the radial position of the controllable element.

11. A positioning system for controlling the radial position of a data transducer relative to a magnetic data storage disk in a random access memory unit comprising: means disposed on the disk for defining a radially extending pattern having a dimension varying with radius; sensing means including means coupled to the data transducer and adjacent to the pattern, for converting variations in the radially variable pattern adjacent the transducer into a first signal varying with time, the speed of the disk and the position of the transducer; first means responsive to the first signal for generating a first set of pulses of regular periodicity synchronous with the disk; second means responsive to the first signal for generating position-representative pulses having a time of occurrence between the first pulses variable with the radial position of the transducer; a variable frequency oscillator; a recycling counter coupled to and controlled by the variable frequency oscillator; means coupled to the first means and the recycling counter, and responsive to the first signals and the last count of the recycling counter for controlling the frequency of the variable frequency oscillator so that a fixed number of cycles occur in the intervals between successive first signals, a register for providing an electrical representation of a desired position of the data transducer; means coupled to the register and the recycling counter for comparing the desired position representation with the counts of the counter to produce an address-representative pulse having a time of occurrence between the first pulses dependent upon a desired position for the transducer; and means coupled to the comparing means and the second means for positioning the transducer in response to the timed difference between the address-representative and time-representative pulses.

12. A random access memory system for use with a data processing system, the random access memory system including a data transducer and a rotatable storage disk, the data transducer being radially positionable relative to the data storage disk to write and read data at selected track addresses relative to the disk, a system including the combination of address register means for providing digitally encoded representations of individual selected track addresses, servomechanism means coupled to the transducer for positioning the transducer at selected addresses in response to control signals, means disposed on the data storage disk and providing a fixed number of symmetrically disposed, circumferentially distributed, reference patterns on at least a portion of a selected surface of the data storage disk, and dividing the pattern surface into alternating areas of differing reflectivity, the pattern being defined by successive generally radially extending spokes having one radial boundary edge and a spiral boundary edge sloping outwardly away from the radial boundary; means including reflective and focussing members disposed on the data transducer for sensing variations in the reference pattern at a point having a fixed radial relation relative to the data transducer, said means including the combination of means providing a narrow beam of collimated light directed radially toward the data transducer and the reflector and focussing lens thereon, optical path directing means for diverting reflected light into a path different from the originated collimated beam, transducer means positioned in the path of the reflected light for generating a signal representative of variations therein; such that a square waveform signal having transition edges coinciding with the passage of the radial boundaries and spiral boundaries is provided, the width of the pulse between the transition denoting a radial boundary edge and a spiral boundary edge being proportional to the radial position of the transducer relative to the data storage disk; radial boundary transition detector means coupled to the sensing means for generating a time base pulse corresponding thereto; spiral boundary transition detector means coupled to the sensing means for generating a radial position pulse in response thereto; recycling binary counter means having a selected number of stages, and providing a fixed number of counts corresponding to the desired number of track address positions; a voltage controlled oscillator having a nominal frequency which corresponds to a multiple of the frequency of the radial boundary pulses, output signals from the voltage controlled oscillator being coupled to advance the recycling counter means, first phase comparator means responsive to the final stage of the recycling counter means and to the time base pulses for controlling the frequency of the voltage controlled oscillator; a binary digital comparator coupled to the address register means and of the recycling counter for generating an individual pulse during each subcycle upon coincidence from the counts represented thereby; and a second phase error signal generator coupled to receive the output pulses from the comparator means and the radial position pulses, and to generate an error signal of amplitude proportional to the phase relation thereof, said error signal being coupled to said servomechanism to control said transducer position.

13. A random access memory system for providing closed loop control of the position of a tranducer relative to a storage member and including the combination of means disposed on the storage member for providing a radially varying reference pattern; means, including means coupled to the data transducer, for sensing the variations in the reference pattern; means responsive to the sensing means for generating a cyclic component signal representative of the speed of the storage member and a position-representative signal having a time relation to the cyclic component dependent upon the position of the transducer; means responsive to a desired position for the transducer and to the cyclic component for providing a position reference signal having a predetermined time relation within the subcycles defined by the cyclic component, and means coupled to control the transducer in response to the time relation between the radial position signal and the position reference signal.

14. A position reference disk for use in controlling the positioning of a movable element, the disk being disposed in a plane normal to a central axis and including means disposed concentrically about the central axis for defining a reference pattern, the reference pattern comprising alternate surface areas of first and second varying characteristics, the surface areas of the first characteristic being disposed in a circumferentially symmetrical pattern defined by first and second edges forming transition lines joining the surface having the second characteristic, the first edges lying along radially extending lines and the second edges extending along spirally extending lines relative to the central axis.

15. For use in a random access memory unit including a positioning servomechanism for a read-write data transducer, a data storage disk including means effectively integral with the disk for establishing the instantaneous actual address of the transducer in the form of radiant energy responsive variations circumferentially spaced as a function of the radial position of the data transducer with respect to the disk, the record disk being disposed for rotation around a central axis, and having a concentric data storage area for a number of concentric data tracks, the radiant energy responsive variations including a selected number of symmetrically disposed radial reference lines extending across the data storage area to form equal position sampling sectors, and a like number of radially varying lines extending spirally from the inner end of each radial reference line to the outer end of the next reference line.

16. The invention as set forth in claim 15 above, wherein the radiant energy responsive variations comprise areas of differing reflectivity, and wherein said areas are disposed at least in part across the data storage portion of the disk surface.

References Cited

UNITED STATES PATENTS

| | | | |
|---|---|---|---|
| 3,177,476 | 4/1965 | Robinson | 340—174.1 |
| 3,212,074 | 10/1965 | Daniels et al. | 340—174.1 |

STANLEY M. URYNOWICZ, JR., *Primary Examiner.*

B. L. HALEY, *Assistant Examiner.*

U.S. Cl. X.R.

318—20, 320